Feb. 21, 1961  F. O. DEUTSCHER  2,972,555
GAS PLATING OF ALUMINA
Filed Nov. 7, 1958
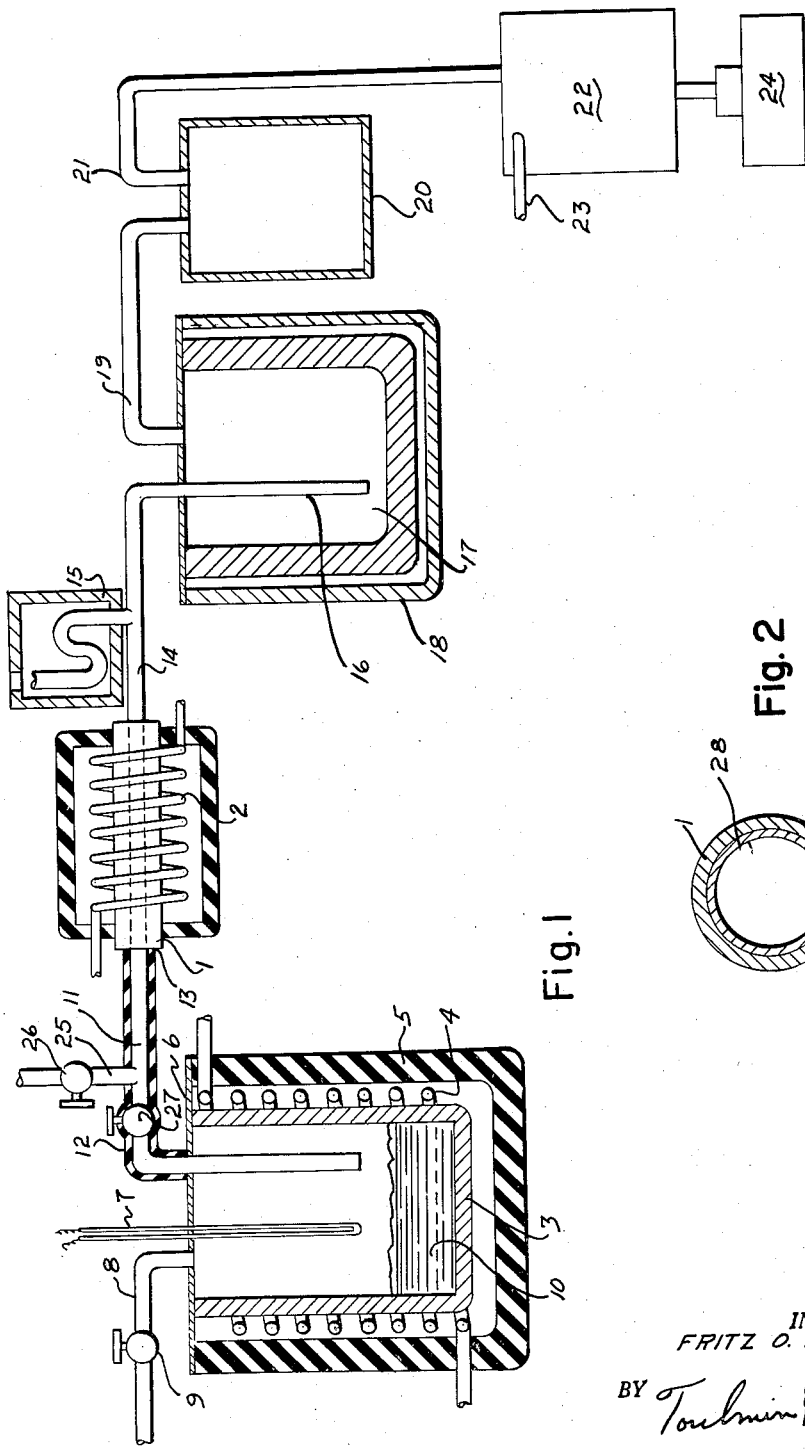
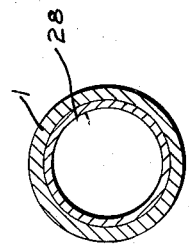
INVENTOR.
FRITZ O. DEUTSCHER
BY *Toulmin & Toulmin*
ATTORNEYS

2,972,555
GAS PLATING OF ALUMINA

Fritz O. Deutscher, Dayton, Ohio, assignor, by mesne assignments, to Union Carbide Corporation, New York, N.Y., a corporation of New York Filed Nov. 7, 1958, Ser. No. 772,520
2 Claims. (Cl. 117—106)

This invention relates to the production of films of alumina and is particularly directed to the production of alumina films on temperature-resistant materials, such as the ceramic bodies, and siliceous bodies, for example, Pyrex glass.

Alumina films on crucibles are desirable in the treatment of high melting point metals to aid in avoidance of contamination by the material of the crucible. Further, other forms such as tubes and the like, may, in handling, be exposed to hot metals and such are readily coated with films.

In the practice of this invention the thin impervious film is attained by decomposing a gaseous aluminum-containing compound. The aluminum-containing compound suitably also contains oxygen to provide the alumina by direct deposition; alternatively, oxidation of a deposited aluminum film may be effected to provide the desired alumina.

Compounds containing oxygen as an integral part of the molecule and useful include: the aluminum alcoholates and the aluminum carboxylates; compounds which require the addition of an oxidizing step separately from the decomposition step include, for example, the aluminum tri-alkyls.

In general the compounds employed are white solids which liquify and then vaporize at temperatures on the order of 150°–450° F.

A particular object of the present invention is to describe the production of aluminum oxide films utilizing heat decomposable compounds as the source of the aluminum-containing film.

An important object of the invention is to describe novel processes for the production of alumina films which processes include the utilization of materials promoting the thermal decomposition of aluminum-containing compounds.

Yet another object of the invention is to provide novel alumina-containing translucent glass-like films.

The invention will be more fully understood by reference to the following detailed description and accompanying drawing wherein:

Figure 1 illustrates apparatus useful in the practice of the invention; and

Figure 2 is a view in section illustrating a film deposited upon a quartz base.

Referring to the drawing the numeral 1 designates a tube of quartz which is surrounded by a heater 2 on its outer periphery. A vaporizer is indicated at 3 and is provided with an electrical heating element 4 which is surrounded by heat insulation 5. The vaporizer has a cover 6 through which there extends a thermocouple 7.

A conduit 8 leads through the cover 6 and is provided with a valve 9. Carrier gas passes through the conduit 8 when the valve is in the opened position to entrain vapors of a vaporizable aluminum compound 10. The thermocouple 7 is in contact with the vapors; these vapors pass through a conduit 11 which is provided with insulation material 12. The conduit 11 is secured to the end of the tube 1 at 13 and the other end of the tube 1 has a conduit 14 extending therefrom, and which conduit is provided with a vacuum gauge 15. The conduit 14 terminates at 16 in a trap 17, which trap is surrounded by a thermo-flask 18. The trap 17 is connected through a conduit portion 19 to a second trap 20. A conduit 21 extends from the trap 20 to a vacuum pump 22 having an exhaust 23. The vacuum pump is driven by motor 24. The traps are provided to prevent products of decomposition of the gaseous compounds from reaching the pump.

In the conduit 11 there is provided an inlet pipe 25 having a valve 26 whereby other gases than the carrier gas may be introduced into the system. Suitably the conduit 11 is valved at 27 for control of the flow of the metal bearing gas to the tube 1.

In the practice of the invention, with valves 26 and 27 closed, it is customary to drive the vacuum pump 22 and to initially exhaust the apparatus of air prior to commencing a plating operation.

The following specific examples illustrate the practice of the invention:

Example I

The quartz tube 1 is maintained at a temperature of 1650° F. by the heater 2; the vaporizer is held at 410° F. and dry nitrogen is introduced through the conduit 8 to the aluminum tri-ethylate maintained in the vaporizer 3. The dry nitrogen serves as a carrier gas and the flow rate of the nitrogen is 255 cc. per minute; vacuum pressure is maintained on the system at 10 mm. of mercury with valve 27 open and valve 26 closed. In a plating time of 30 minutes a thin translucent layer of alumina deposits on the heated area of quartz tube 1.

Example II

With valves 26 and 27 open, the tube 1 is maintained at a temperature of 1200° F. and the vaporizer at a temperature of about 430° F. The vacuum pressure maintained is 20 mm. of mercury. Aluminum triethylate is the plating gas and a flow of 420 cc. per minute of air forms the carrier gas. In a plating time of 30 minutes a translucent somewhat granular deposit of alumina plates in the heated section of the tube 1. Utilization of air as the carrier aids the production of the oxide film.

Example III

With valve 26 closed and valve 27 open aluminum tri-isobutyl is used as the plating gas and 10 cc. per minute of dry nitrogen forms the carrier gas by introduction through the conduit 8. The tube 1 is maintained at a temperature of 842° F. The vaporizer temperature is 167° F. At a vacuum pressure of 2.0 mm. of mercury, and in a plating time of 70 minutes, a good deposit of aluminum metal is obtained. Valve 27 is then closed and valve 26 opened and a stream of oxygen passed through the tube 1 while the tube is heated to very nearly the melting point of aluminum. The aluminum oxidizes to alumina thereby.

Example IV

With valve 26 initially closed and valve 27 open, the tube 1 was heated to a temperature of 1100° F. and a vacuum pressure of 4 mm. of mercury provided on the system. Aluminum tri-ethylate was utilized as the metallizing gas and a carrier flow of 150 cc. per minute of dry nitrogen was introduced through the conduit 8. The vaporizer temperature was maintained at 300° F. The valve 26 was opened as the entrained plating gas flow commenced and through conduit 25 there was introduced water vapor. This water vapor was obtained by bubbling 50 cc. per minute of nitrogen through water held at 800° F. In a plating time of 30 minutes a thin hard coating was obtained in tube 1. The effect of water vapor as illustrated by this example is to lower the decomposition temperature of the aluminum tri-ethylate.

*Example V*

With tube 1 at a temperature of 700° F. and a vaporizer temperature of 350° F. aluminum tri-isopropylate was used as the metallizing medium; to entrain the tri-isopropylate 40 cc. per minute of air was passed through the conduit 8; the vacuum was 4.5 mm. of mercury; and the plating time was 12 minutes. An alumina deposit was obtained in the heated portion of the tube 1.

*Example VI*

Aluminum tri-secbutylate was utilized as the plating gas; for this purpose the vaporizer temperature was 375° F. and the tube 1 was maintained at a temperature of 900° F. The carrier gas flow of 50 cc. per minute of dry nitrogen was introduced through the conduit 8, and the system was under a vacuum pressure of 7.5 mm. of mercury. Air bubbled through water at a rate of 166 cc. per minute entrained water vapor and this was introduced through conduit 25. In a plating time of 60 minutes a white deposit of alumina was obtained in the tube.

*Example VII*

Aluminum tri-isopropylate was utilized as the plating gas, and the vaporizer was held at a temperature of 450° F.; 200 cc. per minute of dry nitrogen were passed through conduit 8; the vacuum was 6.5 mm. of mercury; and the tube 1 was maintained at a temperature of 1000° F. Additional gas formed by passing 200 cc. per minute of nitrogen through a 30 percent ammonium hydroxide solution at a temperature of 80° F. provided ammonia and water as added vapors through conduit 25. In a plating time of 30 minutes a good thin translucent layer was obtained over the entire heating area of tube 1. The utilization of ammonia vapor apparently improves the quantity and quality of the deposit.

*Example VIII*

Aluminum tri-isopropylate was utilized as the plating gas; the vaporizer was held at a temperature of 375° F. and a carrier gas flow of 200 cc. per minute of air was introduced through conduit 8; a combination of monoethylamine at 110 cc. per minute, together with 110 cc. per minute of air bubbled through water at 80° F. was introduced through conduit 25. The tube 1 was held at 1000° F. and the vacuum was 7.5 mm. of mercury. A heavy layer of alumina was formed in the heated part of the tube and tended to be somewhat brownish. The monomethylamine tends to occasion heavier deposits.

To provide for improved uniformity in the films as well as to aid adhesion the film and base may be subjected to a heat treatment. Where the base or substrate is constituted of a material having a higher softening or melting point than alumina, the alumina film may be fused to the base by such heat treatment. Zirconia, for example, has a melting point well above that of the alumina and fusion to such a base may be occasioned simply by heating the composite strongly and sufficiently to cause the fusion of the alumina.

As shown in Figure 2 the film 28 of alumina is adhered to the inner surface of tube 1. Depending upon the material of tube 1 the film may be readily heated as described.

The substrate employed in the practice of the invention should be resistant without deformation to temperatures of at least 500° F.; in general, the substrate temperatures employed have been in the range of 800° F. to 1650° F. in order to secure adequate deposition within reasonable plating times. For a given temperature the deposition rate tends to increase with the utilization of additives to the plating gas. Additives, however, tend to darken the film; acetic acid, for example, tended to result in a dark gray coating, while sulfurd ioxide tended to occasion black deposits. For some purposes such discoloration is unimportant, but where purity is a factor such materials are avoided.

In general the deposits which are obtained with the aluminum tri-isobutyl tend to be discolored due probably to the presence with the tri-isobutyl starting material of impurities such as the aluminum di-isobutyl hydride. This hydride exists to the extent of 40 percent in commercial products. Also the alcoholates tend to have alcohols as impurities—however, for many purposes the resultant thin film is satisfactory.

The aluminum tri-alkyls tend to produce very thin films of aluminum which may be readily oxidized through. The deposits obtained are uniformly thin whether derived from the alkyls or the alcoholates and generally less than 1 mil.

It will be understood that this invention is susceptible to modification in order to adapt it to different usages and conditions and accordingly, it is desired to comprehend such modifications within this invention as may fall within the scope of the appended claims.

What is claimed is:

1. A method of gas plating alumina on a ceramic substrate surface which comprises the steps of heating said ceramic substrate to a temperature of about 1000° F., heating aluminum tri-isopropylate to a temperature of approximately 450° F. in contact with nitrogen to provide a gaseous mixture of nitrogen and aluminum tri-isopropylate, introducing additional gas composed of ammonia and water vapor into a gaseous stream of said mixture of nitrogen and aluminum tri-isopropylate, and contacting said heated ceramic substrate with the combined gaseous mixture for a length of time sufficient to effect thermal decomposition of said aluminum tri-isopropylate and deposition of a film deposit of alumina upon the substrate, and thereafter removing the substrate from the gaseous flow.

2. As an article of manufacture, a ceramic substrate having a deposit of alumina thereon and produced in accordance with the method of claim 1.

References Cited in the file of this patent

UNITED STATES PATENTS

| | | |
|---|---|---|
| 2,805,965 | Robinson | Sept. 10, 1957 |
| 2,831,780 | Dryrup | Apr. 22, 1958 |
| 2,867,546 | MacNevin | Jan. 6, 1959 |